(12) United States Patent
Kawamura (10) Patent No.: US 6,496,293 B2
(45) Date of Patent: Dec. 17, 2002

(54) OPTICAL SCANNING DEVICE, SCANNING OPTICAL SYSTEM, OPTICAL SCANNING METHOD AND IMAGE FORMING APPARATUS

(75) Inventor: Atsushi Kawamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 82 days.

(21) Appl. No.: 09/797,563

(22) Filed: Mar. 5, 2001

(65) Prior Publication Data

US 2001/0026394 A1 Oct. 4, 2001

(30) Foreign Application Priority Data

Mar. 6, 2000 (JP) ........................................ 2000-060120

(51) Int. Cl.⁷ .............................................. G02B 26/08
(52) U.S. Cl. ........................ 359/212; 359/205; 359/207; 359/215; 359/216
(58) Field of Search ................................. 359/196–226, 359/738–740; 347/241–244, 256–261

(56) References Cited

U.S. PATENT DOCUMENTS

| 6,185,026 B1 | 2/2001 | Hayashi et al. |
| 6,198,562 B1 | 3/2001 | Hayashi et al. |
| 6,400,391 B1 * | 6/2002 | Suhara et al. ................ 347/244 |

\* cited by examiner

*Primary Examiner*—James Phan
(74) *Attorney, Agent, or Firm*—Oblon, Spivak, McClelland, Maier & Neustadt, P.C.

(57) ABSTRACT

An aperture shapes a beam from a light source, a light deflector deflects the beam, and a scanning imaging optical system condenses the deflected beam toward a surface to be scanned so as to form a beam spot on the surface to be scanned. A wavelength $\lambda$ of the beam emitted by the light source satisfies: 350 (nm)$\leq\lambda\leq$600 (nm), and, a desired diameter $\phi$ of the beam spot and the wavelength $\lambda$ satisfy: 0.5 (mm)$\leq\phi^2/\lambda\leq$6 (mm).

22 Claims, 8 Drawing Sheets

OPTICAL SCANNING DEVICE, SCANNING OPTICAL SYSTEM, OPTICAL SCANNING METHOD AND IMAGE FORMING APPARATUS

BACKGROUND OF THE INVENTION

1. Field of the Invention

The present invention generally relates to an optical scanning device, a scanning optical system, an optical scanning method and an image forming apparatus.

2. Description of the Related Art

Optical scanning devices have been widely used in image forming apparatuses such as a digital copier, an optical printer, a facsimile apparatus and so forth. Recently, a request for image quality in images formed by the image forming apparatuses have become severe. Thereby, improvement in performance of the optical scanning devices has been demanded.

'A writing density' is one factor which directly affects image quality of images formed through optical writing by the optical scanning device. As the writing density is increased, the resolution of images formed increases, and, thereby, it is possible to form clear and smooth images.

In order to increase the writing density (dpi), it is necessary to reduce the diameter of a beam spot formed on a surface to be scanned by the optical scanning device.

Ideally, the spot diameter is a beam spot diameter of a deflected light beam. However, when a curvature of field occurs, it is not possible that the image surface of the deflected light beam coincides with the surface to be scanned completely, and, thereby, the spot diameter varies as the image height varies. Accordingly, in order to render 'a stable beam spot' having a small variation in spot diameter, it is necessary to well correct the curvature of field of the optical scanning system. In the related art, there are many scanning optical systems in which the curvature of field is well corrected.

When an optical system of the optical scanning device is assembled, an error in precision of assembly inevitably occurs. Accordingly, even when the curvature of field is well corrected in a design stage, it may not be possible that the image surface of the scanning optical system coincides with the surface to be scanned according to the design. When the image surface is separate from the surface to be scanned due to an influence of assembling error or the like, the spot diameter of the beam spot formed on the surface to be scanned becomes larger than the spot diameter according to the design.

Accordingly, when the scanning optical system of the optical scanning device is designed, 'a certain degree of separation' of the image surface from the surface to be scanned due to assembling error or working error is assumed, and, a design is made such that, even when the image surface is separate from the surface to be scanned, the variation in the spot diameter of the beam spot on the surface to be scanned should fall within 'an allowable range'.

A position of a beam waist of the scanning beam is located on the image surface. Accordingly, a difference between the position of the beam waist and the surface to be scanned is called 'defocus'.

A range in defocus such that the variation in spot diameter due to the defocus falls within the allowable range is called 'allowable depth', and, a characteristic curve indicating a relationship between th defocus and spot diameter is called 'depth curve'.

A practical 'satisfactory scanning optical system' is an optical system having a satisfactory optical performance of design, and, also, having a proper allowable depth such that 'an excessive precision' is not requested to assembling and working.

Japanese Laid-Open Patent Application (Kokai) No. Hei 10-232358 discloses an optical system rendering a beam spot having a small diameter. This optical system is such that a scanning optical system condensing a deflected beam toward a surface to be scanned includes three or four lenses, and the beam spot having a very small diameter of 30 μm for a wavelength of 780 nm used is rendered, and an allowable depth of 1 mm is rendered.

It is considered that it is very difficult to reduce the diameter of a beam spot while the allowable depth is secured to be more than approximately 1 mm for a wavelength more than 700 nm used.

Employing a beam having a short wavelength is effective for reducing the diameter of a beam spot as is well known. In principle, it is possible to reduce the diameter of a beam spot in proportion to a wavelength used. For a semiconductor laser which is generally used as a light source of the optical scanning device, a wavelength of light emitted therefrom is reduced, and, 'a short wavelength equal to or shorter than 400 nm' is being rendered. For an excimer laser, a wavelength of 200 nm has been already rendered.

In principle, it is possible to reduce a diameter of a beam spot by employing a light source of a short wavelength. However, when simply reducing a diameter of a beam spot, the allowable depth becomes narrower accordingly.

In the related art, it is not known to secure 'a necessary allowable depth' while reducing a diameter of a beam spot employing a light source of a wavelength shorter than 600 nm, that is, 'an art such as to render both reduction of diameter of beam spot employing a short wavelength and satisfactory allowable depth'.

SUMMARY OF THE INVENTION

An object of the present invention is to reduce a diameter of a beam spot employing a light source for optical scanning of a short wavelength, and, also, to secure a necessary allowable depth.

An optical scanning device according to the present invention, comprises:

an aperture shaping a beam from a light source;

a light deflector deflecting the beam; and a scanning imaging optical system condensing the deflected beam toward a surface to be scanned so as to form a beam spot on the surface to be scanned, wherein:

a wavelength λ of the beam emitted by the light source satisfies:

$$350 \text{ (nm)} \leq \lambda \leq 600 \text{ (nm)} \tag{1}$$

and, a desired diameter φ of the beam spot and the wavelength λ satisfy:

$$0.5 \text{ (mm)} \leq \phi^2/\lambda \leq 6 \text{ (mm)} \tag{2}$$

The above-mentioned spot diameter φ means a diameter of an area through which the light intensity is equal to or higher than $1/e^2$ where the intensity distribution of the beams spot is normalized so that the maximum value in the intensity distribution becomes 1. Based on the above-mentioned conditional formula (2), the range of the spot diameter φ is 17.3 through 60 μm when the wavelength λ=600 (nm); and the range of the spot diameter φ is 13.2 through 46 μm when the wavelength λ=350 (nm). It is possible to render the beam spot having the spot diameter in this range with a practical allowable depth.

Further, the following conditions (the range of the λ is further limited, and the desired spot diameter φ and wavelength λ are further limited) may be satisfied:

$$350 \text{ (nm)} \leq \lambda \leq 500 \text{ (nm)} \tag{3}$$

$$0.5 \text{ (mm)} \leq \phi^2/\lambda \leq 3 \text{ (mm)} \tag{4}$$

and, a root-mean-square value RMS(wavefront aberration) of wavefront aberrations on a surface of an exit pupil may satisfy:

$$\text{RMS(wavefront aberration)} \leq 0.2 \tag{5}$$

Thereby, it is possible to render the satisfactory beam spot having a smaller diameter.

There, the above-mentioned 'exit pupil' means an image of the aperture (image of the opening thereof) formed through the optical system disposed on the surface-to-be-scanned side of the aperture.

The above-mentioned root-mean-square value RMS (wavefront aberration) of the wavefront aberrations on the surface of the exit pupil is calculated as follows:

The wave surface of the beam on the surface of the exit pupil is divided into N area elements having the minute areas same as each other. Then, the root-mean-square value is calculated from the maximum wavefront aberrations $W_i$ (i=1, 2, 3, ..., N) for the respective i-th area elements according to the well-known definition of root mean squire. The method of dividing the wave surface into area elements may be a method such that squares are obtained, a method such that concentric circular areas or concentric elliptical areas are obtained, or the like. The number N of the thus-obtained area elements is preferably equal to or larger than 100. When the number N is as large as such an order, the RMS(wavefront aberration) does not depend on the method of dividing into the area elements substantially.

It is preferable that an angle θ formed on a main scan plane (plane which the chief ray of the deflected beam deflected ideally traces) between a normal of the surface to be scanned and any scanning beam satisfies:

$$\cos \theta \geq 0.9 \tag{6}$$

The shape of the opening of the aperture is basically rectangular. However, an elliptical shape obtained as a result of the four corner of a rectangle are rounded smoothly, a hexagon, an octagon, a circle, an ellipse, or the like is also allowable.

Further, the light source may comprise a semiconductor laser. In this case, the divergent beam emitted from the light source may be coupled by a coupling optical system to the subsequent optical system, and the thus-coupled beam may be shaped by the aperture. As the above-mentioned coupling optical system, a coupling mirror can be used. However, a coupling lens or a diffraction grating may also be used.

The function of the coupling optical system may be a function of transforming a divergent light beam from the semiconductor laser into a divergent beam in which the divergence is weakened, a function of transforming into a parallel beam, or a function of transforming into a convergent beam.

The coupling optical system may comprise a coupling lens, and the coupling function thereof may comprise a collimating function.

The light deflector may comprise a rotary mirror (rotary mono-surface mirror, a rotary bi-surface mirror, or a rotary polygon mirror) comprising a deflection reflective surface(s); and the device may further comprise a line-image imaging optical system imaging a line image long in a main scan direction on or in the vicinity of the deflection reflective surface, from the coupled beam.

As the light source, an excimer laser mentioned above, various types of gas laser, solid laser, LED or the like may be also used, other than the above-mentioned semiconductor laser.

As the above-mentioned line-image imaging optical system, a convex cylindrical lens, or a concave cylindrical mirror may be used.

As the light deflector, a swinging mirror such as a galvano mirror may also be used, other than the rotary mirror.

The scanning imaging optical system condensing the beam deflected by the light deflector toward the surface to be scanned may consist of at least single lens, at least single imaging mirror having an imaging function, or a mixture of at least one lens and at least one imaging mirror.

A scanning optical system according to the present invention is used in an optical scanning device comprising an aperture shaping a beam from a light source, a light deflector deflecting the beam, and a scanning imaging optical system condensing the deflected beam toward a surface to be scanned so as to form a beam spot on the surface to be scanned. The scanning optical system directs the beam from the light source which emits light having a predetermined wavelength λ which falls within a range such that:

$$350 \text{ (nm)} \leq \lambda \leq 600 \text{ (nm)} \tag{1}$$

to the surface to be scanned so as to form the beam spot thereon;

the scanning optical system comprises at least the aperture, light deflector and scanning imaging optical system; and the scanning optical system satisfies the following conditional formulas for a desired diameter of the beam spot φ:

$$0.5 \text{ (mm)} \leq \phi^2/\lambda \leq 6 \text{ (mm)} \tag{2}$$

$$\phi = 0.7\lambda/(f/a) \tag{7}$$

where f denotes a distance from an exit pupil of the optical system (image of the aperture formed by this optical system) disposed on the the-surface-to-be-scanned side of the aperture to an image surface of the scanning imaging optical system (in an ideal case, coincides with the surface to be scanned), and 2a denotes a diameter of the aperture on a surface of the exit pupil.

In the above-mentioned scanning optical system, the following condition formulas (for the range of the predetermined wavelength λ and condition for the desired spot diameter φ and predetermined wavelength λ) may be satisfied:

$$350 \text{ (nm)} \leq \lambda \leq 500 \text{ (nm)} \tag{3}$$

$$0.5 \text{ (mm)} \leq \phi^2/\lambda \leq 3 \text{ (mm)} \tag{4}$$

and,
   a root-mean-square value RMS(wavefront aberration) of wavefront aberrations on the surface of the exit pupil may satisfy:

$$RMS(\text{wavefront aberration}) \leq 0.2 \tag{5}$$

Further, the field angle of the scanning imaging optical system may be set preferably such that an angle θ formed on a main scan plane (plane which the chief ray of the deflected beam ideally deflected traces) between a normal of the surface to be scanned and any scanning beam satisfies:

$$\cos\theta \geq 0.9 \tag{6}$$

Further, the light source may comprise a semiconductor laser. In this case, the divergent beam emitted from the light source may be coupled by a coupling optical system to the subsequent optical system; and the aperture may be disposed on the surface-to-be-scanned side of the coupling optical system. In this case, the coupling optical system may comprise a coupling lens, and the coupling function thereof may comprise a collimating function.

Further, the light deflector may comprise a rotary mirror comprising a deflection reflective surface; and
   the system may further comprise a line-image imaging optical system imaging a line image long in a main scan direction on or in the vicinity of the deflection reflective surface, from the coupled beam.

The line-image imaging optical system may comprise a concave cylindrical mirror or a convex cylindrical lens.

The scanning imaging optical system may comprise lenses only. In this case, the scanning imaging optical system may comprise two lenses.

The coupling optical system may comprise a coupling lens, and the coupling function thereof may comprise a collimating function; and
   at least one surface of the two lenses of the scanning imaging optical system may comprise a special toroidal surface in which a shape in a main scan section is a non-arc shape, and a shape in a sub-scan section is a non-arc shape and varies in a main scan direction.

An optical scanning method according to the present invention is a method of shaping a beam from a light source by an aperture, deflecting the beam by a light deflector, condensing the deflected beam toward a surface to be scanned by a scanning imaging optical system and forming a beam spot on the surface to be scanned, and, thus, performing optical scanning of the surface to be scanned. The above-mentioned optical scanning device according to the present invention is used in this method.

An image forming apparatus according to the present invention performs optical scanning of a photosensitive surface of a photosensitive medium by an optical scanning device, and forms a latent image thereon, visualizes the latent image so as to obtain a visible image therefrom. The above-mentioned optical scanning device according to the present invention is used in this image forming apparatus for performing the optical scanning of the photosensitive surface of the photosensitive medium.

In the image forming apparatus, the photosensitive medium may comprise a photoconductive photosensitive body, and, the electrostatic latent image formed through uniform charging of the photosensitive surface and optical scanning by the optical scanning device may be visualized into a toner image. The toner image is fixed onto a sheet recording medium (transfer paper, or an OHP sheet (plastic sheet for an overhead projector)).

Alternatively, a film for photography with silver halide may be used as the photosensitive medium, for example. In this case, the latent image formed through the optical scanning by the optical scanning device is visualized by a method of developing in an ordinary process of photography with silver halide. Such an image forming apparatus may be embodied as an optical plate-making system, or an optical drawing apparatus, for example.

The above-mentioned image forming apparatus according to the present invention may be applied to a laser printer, a laser plotter, a digital copier, a facsimile apparatus or the like.

According to the well-known Rayleigh's formulas, resolution R and focal depth D when a light source emitting a beam of a wavelength λ is used can be expressed as follows (Journal, O plus E, No. 182, Page 93):

$$R = k1 \cdot \lambda/(NA) \tag{1A}$$

$$D = k2 \cdot \lambda/(NA)^2 \tag{2A}$$

There, k1 and k2 are proportional coefficients determined by a use of an imaging system and/or circumferential conditions.

The intensity distribution I(X) of a diffracted image formed by a rectangular aperture having a width of 2a, after being normalized so that the maximum intensity becomes 1, can be expressed as follows:

$$I(X) = \{\sin(aX)/(aX)\}^2 \tag{3A}$$

As X approaches 0, I(X) approaches 1.

Figure 2:
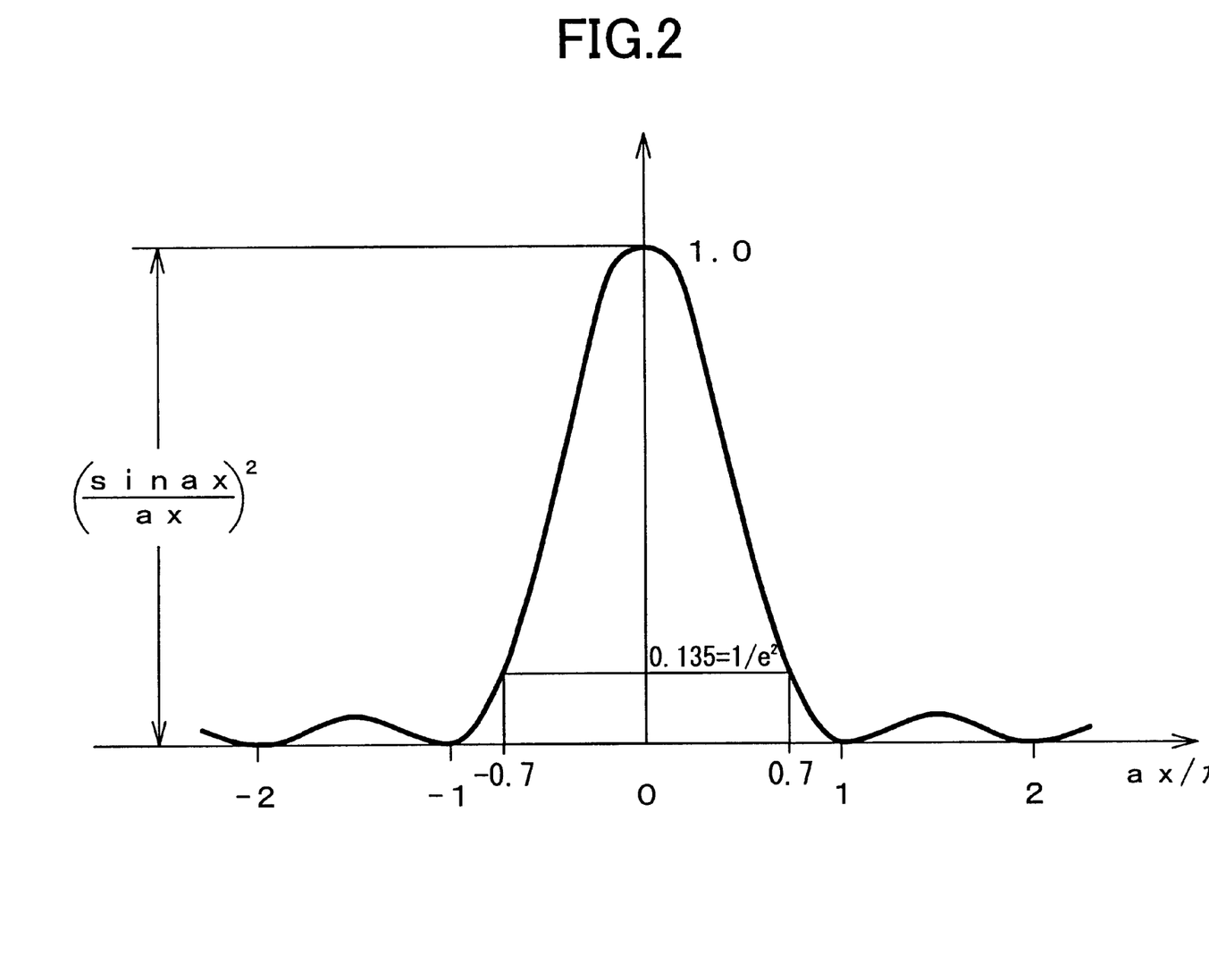
FIG. 2 illustrates a light intensity distribution of a beam spot and a spot diameter thereof.

FIG. 2 shows the above-mentioned formula (3A). The horizontal axis indicates aX/π, and the vertical axis indicates the right side of the formula (3A). Assuming that the distance from the surface of the exit pupil to the image surface of the imaging system as 'f', X=2πx/(λ·f). As X has a dimension of reciprocal of length, 'x' has a dimension of length.

As shown in FIG. 2, the formula (3A) is such that I=0 (first local minimum) when aX=π.

Accordingly, $$aX = a \cdot 2\pi x/(\lambda \cdot f) = \pi$$

$$x = \lambda \cdot f/(2a) = (\lambda/2) \cdot (f/a)$$

Then, because (f/a) is equal to the numerical aperture NA, $$x = (\lambda/2) \cdot NA = (\tfrac{1}{2}) \cdot \lambda/(NA)$$

The value of 'x' in the above expression is the distance from the center of the intensity distribution shown in FIG. 2 to the first local minimum. Accordingly, the beam diameter $\phi_0$ which is the distance between the first local minimums is as follows:

$$\phi_0 = 2x = \lambda/(NA)$$

This value is one in a case where k1=1 in the above formula (1A).

In a scanning optical system, a spot diameter is expressed by $1/e^2$ of the central intensity according to the general custom. Accordingly, the right side of '$I(X)=1/e^2$' is substituted for the left side of the formula (3A), and the thus-obtained formula is solved for aX. Then, aX~0.7π. Therefore, the spot diameter φ expressed by $1/e^2$ is $$\phi = 0.7 \cdot \lambda/(NA) \tag{4A}$$

Accordingly, the wavelength λ of light emitted by the light source, the spot diameter φ of the beam spot formed by the scanning optical system and the numerical aperture NA of the optical system disposed on the surface-to-be-scanned side of the aperture satisfy the formula (4A).

In the above-mentioned formula (2A), k2, and, then, the focal depth D, accordingly, varies, in accordance with the allowable range of variation in spot diameter set for the target spot diameter (designed median of spot diameter). When the wavefront aberration is satisfactorily corrected into approximately 0, and variation in spot diameter is controlled to be small, the range of k2 is 0.7 through 1.0.

That is, the allowable range of variation in spot diameter for the target spot diameter $\phi$ is, generally, within ±5% through within ±20%. When the allowable range is determined as $\phi(1±0.05)$, k2=0.7. When the allowable range is determined as $\phi(1±0.2)$, k2=1.0.

The above-mentioned focal depth D gives the value of the range of defocus when the range of variation in spot diameter falls within the range of $\phi(1±0.05)$ through $\phi(1±0.2)$. Accordingly, it corresponds to the above-mentioned allowable depth. Therefore, the focal depth D is referred to as allowable depth D, hereinafter.

When the allowable depth D is such that D <0.7 (mm), a very high precision and/or adjustment is required in assembling of components, and, a positional precision for peripheral components such as the photosensitive medium acting as the surface to be scanned and so forth becomes severe. Further, it is necessary to control variation in position of the image surface due to environmental variation to be small. For this purpose, it is necessary to use a glass material having a small change in property due to temperature/humidity for the scanning optical system. When a plastic material is used therefor, some measures to cancel the variation should be provided. Accordingly, while a beam spot having a small diameter and having small variation can be rendered, the manufacturing costs increase.

When the allowable depth D is such that $0.7 \leq D \leq 10$ (mm), the component precision, positional precision, disposition precision of peripheral components can be eased, and, also, some remaining error of property variation due to environmental variation can be allowed. Accordingly, costs can be reduced, and very practical system can be achieved.

When the allowable depth D exceeds 10 mm, and becomes further larger, while the allowable range in component precision, positional precision and so forth becomes large, it is not possible to reduce the diameter of beam spot to a necessary value.

Therefore, according to the present invention, the allowable depth D is determined such that $0.7 \leq D \leq 10$ (mm), the light source of a short wavelength (350 nm through 600 nm) is used, and, thereby, forming of a small-sized, stable beam spot is achieved.

The above-mentioned conditional formula (2) indicates the condition for this porpoise. When the lower limit 0.5 mm thereof is exceeded, the costs required for the optical materials, component working, positional precision and so forth are very high, and, provision of a practical optical scanning device or scanning optical system becomes difficult. That is, when the lower limit is exceeded, the spot diameter of the beam spot formed is reduced to be smaller than 13 $\mu$m (for the wavelength of 350 nm). However, even if the allowable range of variation in spot diameter is set as $\phi(1±0.2)$, the allowable depth is equal to or smaller than 0.5 mm, and, thus, is further lower than 0.7 mm. Accordingly, it is not possible to render the optical scanning device and scanning optical system without increase in costs.

Further, when the upper limit of the conditional formula (2) is exceeded, although the allowable depth becomes larger, the spot diameter of the thus-obtained beam spot is, even if $\lambda$=350 nm, larger than 46 $\mu$m, and, thereby, there is little significance that the beam spot is made to have a small diameter employing the light source of short wavelength.

When the lower limit 350 nm of the range of wavelength $\lambda$ of light emitted by the light source: 350 through 600 (nm) (conditional formula (1)) is exceeded, the transmittance of the plastic lenses is degraded when the plastic lenses are used in the scanning imaging optical system. Even when lenses of optical glass are used therefor, it is necessary to use material having satisfactory transmittance for a short wavelength. Thereby, the costs increase. Further, the material of the optical system disposed on the light-source side of the light deflector is also limited. When the upper limit 600 nm of $\lambda$ is exceeded, satisfactory advantage in reduction of diameter of beam spot cannot be obtained.

As a result of the conditional formulas (1) and (2) being satisfied, a satisfactory small spot diameter (for example, 30 $\mu$m) can be easily and positively obtained, and a satisfactory allowable depth (equal to or larger than 0.7 mm) can be secured.

In order to achieve a further smaller spot diameter in beam spot, it is necessary to consider influence of wavefront aberration together with the range of wavelength of light emitted by the light source, and the range of the parameter $\phi^2/\lambda$.

For example, in order to obtain the spot diameter of 15 $\mu$m, it is necessary that the wavelength of light emitted by the light source falls within the range of 350 nm through 500 nm (conditional formula (3)), and $\phi^2/\lambda$ falls within the range of 0.5 mm through 3 mm (conditional formula (4)), and, also, it is preferable that RMS(wavefront aberration) falls equal to or smaller than 0.2 (conditional formula (5)). That is, in order to reduce the spot diameter, the numerical aperture NA should be larger and, thereby, the diameter of beam incident on the scanning imaging optical system should be larger. However, if so, imaging of the beam spot is easily affected by the wavefront aberration. Accordingly, it is necessary to reduce the wavefront aberration.

As an example, change in spot diameter in the main scan direction due to the defocus when a semiconductor laser emitting light having a wavelength $\lambda$=500 (nm) is used as the light source, calculated with RMS(wavefront aberration) as a parameter, will now be shown as a list:

| Defocus (mm) | RMS (wavefront aberration) | | | | |
|---|---|---|---|---|---|
| | 0.011 | 0.098 | 0.125 | 0.163 | 0.203 |
| | Spot diameter ($\mu$m) | | | | |
| −1.20 | 47.41 | 48.65 | 48.42 | 48.43 | 50.37 |
| −1.05 | 44.73 | 46.99 | 46.78 | 46.65 | 49.40 |
| −0.90 | 41.70 | 45.10 | 44.46 | 43.80 | 48.27 |
| −0.75 | 36.81 | 41.38 | 22.68 | 22.59 | 45.69 |
| −0.60 | 23.06 | 24.16 | 22.14 | 22.28 | 23.42 |
| −0.45 | 21.67 | 21.57 | 21.95 | 22.22 | 23.52 |
| −0.30 | 20.78 | 21.08 | 21.54 | 22.32 | 23.41 |
| −0.15 | 20.25 | 21.06 | 21.82 | 22.49 | 23.93 |
| 0.00 | 20.01 | 21.27 | 22.29 | 22.87 | 24.22 |
| 0.15 | 20.03 | 21.50 | 24.92 | 23.42 | 24.32 |
| 0.30 | 20.33 | 22.50 | 24.01 | 24.85 | 26.11 |
| 0.45 | 20.97 | 23.45 | 26.05 | 26.75 | 27.55 |
| 0.60 | 22.08 | 26.08 | 28.12 | 29.89 | 29.45 |
| 0.76 | 36.38 | 28.87 | 31.27 | 33.24 | 32.89 |
| 0.90 | 41.57 | 34.29 | 35.44 | 36.43 | 37.04 |
| 1.06 | 44.30 | 40.66 | 44.23 | 45.24 | 42.04 |
| 1.20 | 46.58 | 47.98 | 46.68 | 48.43 | 50.24 |

Figure 3:
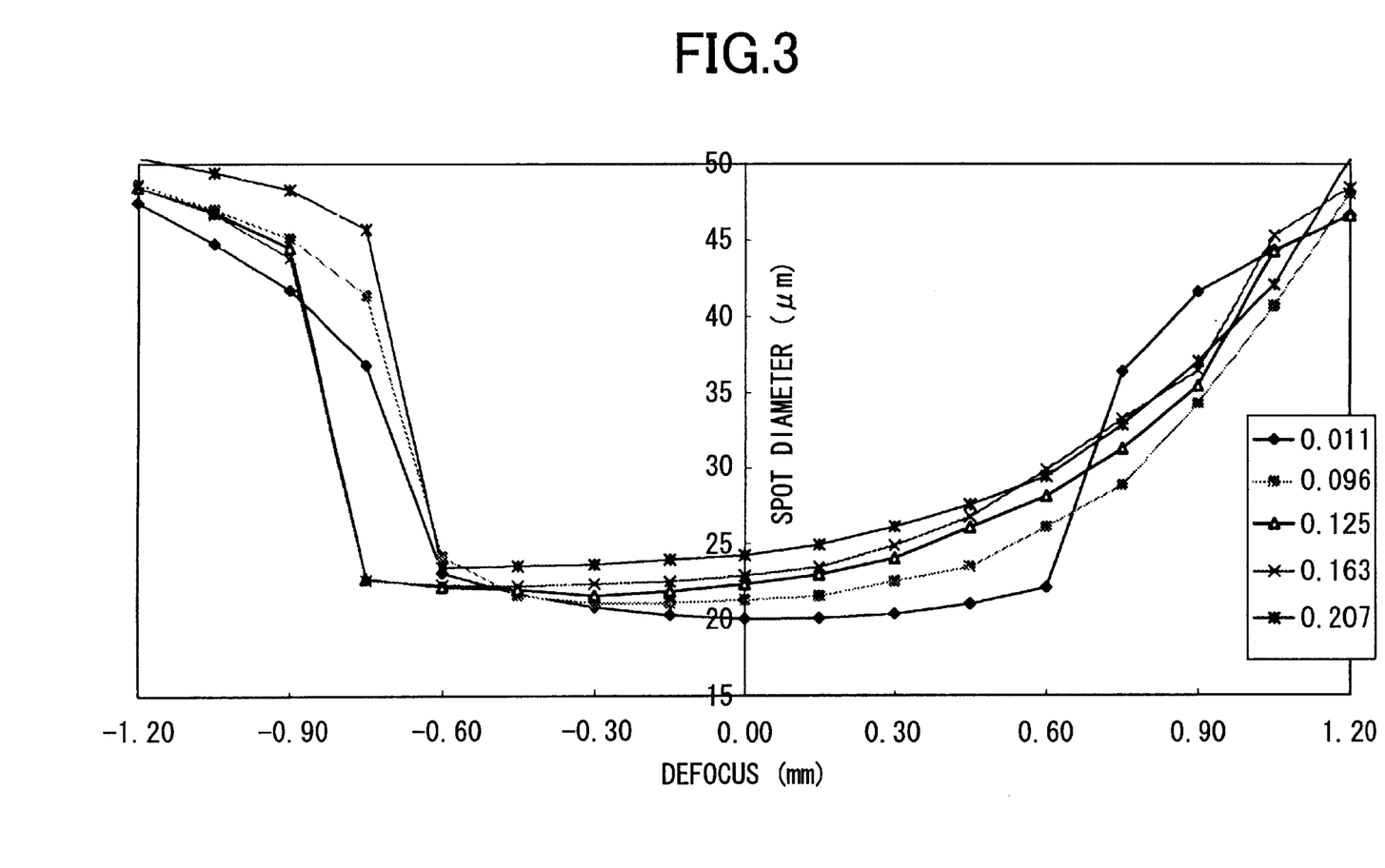
FIG. 3 shows an influence of RMS(wavefront aberration) on an allowable depth.

FIG. 3 shows these results.

In this example, $\lambda$=500 (nm), the target spot diameter $\phi$=20 ($\mu$m), $\phi^2/\lambda$=0.8. When RMS(wavefront aberration)

≦0.2, it is possible to expect the defocus range (allowable depth) equal to or larger than approximately 0.9 mm even when the allowable range of variation in spot diameter is assumed as φ(1±0.125); the allowable maximum spot diameter: 22.5 μm. When the RMS(wavefront aberration) exceeds 0.2, as well as increase in variation in spot diameter, degradation in allowable depth such as the depth curve expressing relationship between spot diameter and defocus becoming remarkably asymmetrical with respect to positive/ negative of defocus, occur.

The above-mentioned conditional formula (6) will now be discussed.

The above-described formula (2A) holds when θ=0 and cos θ=1. With regard to the sub-scan direction, it is possible to set so that the scanning beam is perpendicular to the surface to be scanned (θ=0) through all the scanning range. However, with regard to the main scan direction, there are many cases where θ≠0 for the reason that the optical components should be reduced in size, and so forth. In such cases, the depth in the main scan direction is a product of the conditional formula (2) and power of cos θ, and the allowable depth is reduced. Accordingly, it is preferable that the conditional formula (6) is satisfied as a result of the scanning angle, power distribution and sizes of optical components and so forth being determined appropriately.

Other objects and further features of the present invention will become more apparent from the following detailed description when read in conjunction with the accompanying drawings.

DETAILED DESCRIPTION OF THE PREFERRED EMBODIMENTS

Figure 1:
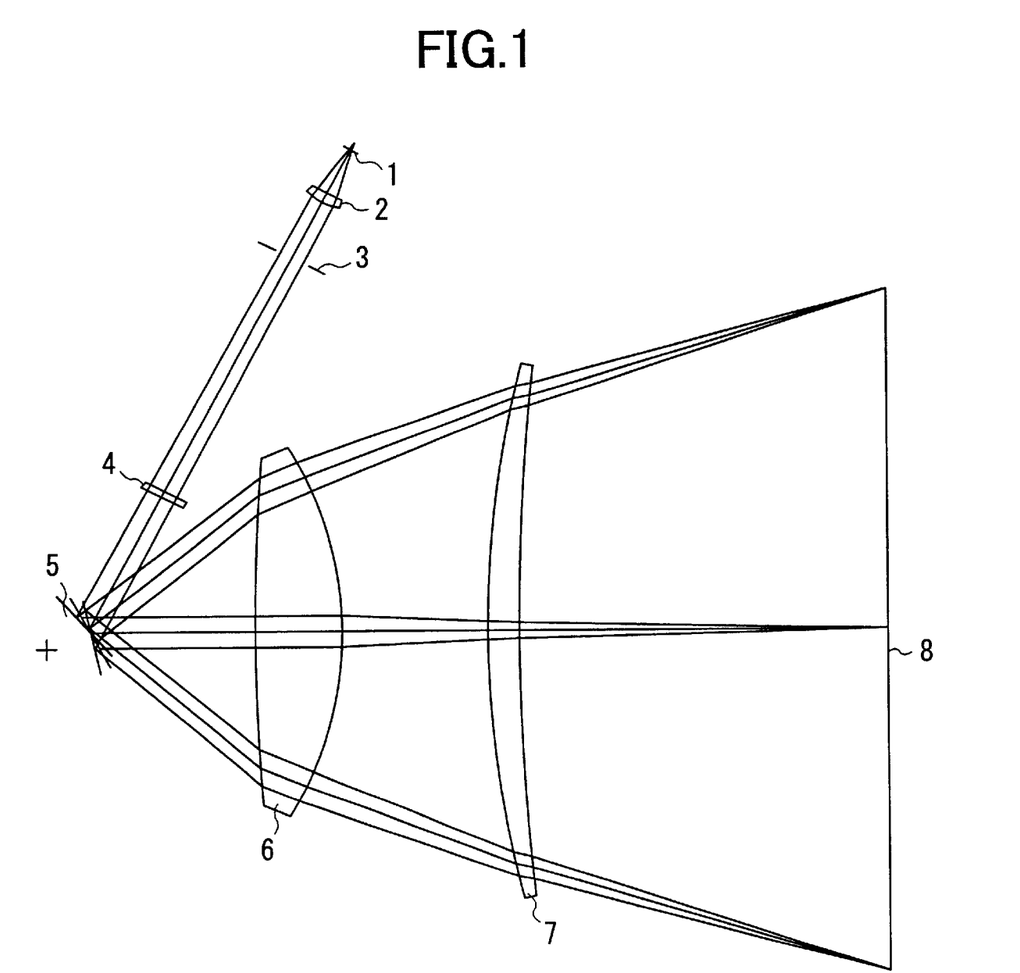
FIG. 1 illustrates first and second embodiments of the present invention.

FIG. 1 illustrates an optical configuration of an optical scanning device in each of first and second embodiments of the present invention.

A divergent beam emitted by a semiconductor laser 1 acting as a light source is coupled to a subsequent optical system by a coupling lens 2 acting as a coupling optical system, and, thus, is transformed into a form (a parallel beam, a divergent beam or a convergent beam) suitable for the subsequent optical system. The beam passing through the coupling lens 2 then passes through an opening of an aperture 3. When passing through the opening of the aperture 3, the periphery of the beam is cut out and, thus, the beam is shaped thereby. Then, the beam is condensed by a convex cylindrical lens 4 acting as a line-image imaging optical system in a sub-scan direction, and, therefrom, 'a line image long in a main scan direction' is imaged at a position on or in the vicinity of a deflection reflective surface of a rotary polygon mirror 5 acting as a light deflector.

The beam obtained through reflection by the deflection reflective surface of the rotary polygon mirror 5 is thus deflected thereby at a uniform angular velocity as the rotary polygon mirror 5 rotates at a uniform velocity. The thus-obtained deflected beam passes through two lenses 6 and 7 which act as a scanning imaging optical system, in sequence, and, through the function of the lenses 6 and 7, is condensed toward a surface to be scanned 8 (actually, a photosensitive surface of a photoconductive photosensitive body or the like), a beam spot is formed therefrom on the surface to be scanned 8, and thus, optical scanning of the surface to be scanned 8 is performed.

The semiconductor laser 1 is such that a wavelength λ of a beam emitted therefrom falls within a range such that:

$$350 \text{ (nm)} \leq \lambda \leq 600 \text{ (nm)} \tag{1}$$

Further, a desired diameter φ of the beam spot formed on the surface to be scanned 8 and the above-mentioned wavelength λ satisfy the following condition:

$$0.5 \text{ (mm)} \leq \phi^2/\lambda \leq 6 \text{ (mm)} \tag{2}$$

The first and second embodiments of the present invention shown in FIG. 1 will now be described in detail.

The first and second embodiments are the same as one another except the aperture 3. Specifically, the first and second embodiments are different from one another only in the numerical aperture NA rendered by the optical components (cylindrical lens 4 and lenses 6 and 7) disposed between the aperture 3 and the surface to be scanned 8.

The shape of the opening of the aperture 3 is rectangular in each of the first and second embodiments.

Data common between the first and second embodiments is shown below:

Light Source 1: semiconductor laser, wavelength of light emitted therefrom: 400 nm Coupling lens 2:

focal length: 27 mm; and coupling function: collimating function (such that the beam is made to be a parallel beam through the coupling thereby);

Cylindrical lens 4:

a plano-convex lens having a convex surface (but having a power only in the sub-scan direction) directed to the light source; and focal length: 66 mm (disposed at a position away from the position of the deflection reflective surface by 66 mm in the direction toward the light source);

Rotary polygon mirror 5:

the number of deflection reflective surfaces: 5;

the radius of inscribing circle: 20 mm; and the angle formed, when the chief ray of the deflected beam extends in parallel to the optical axes of the lenses 6 and 7, between this chief ray and the chief ray of the beam incident on the deflection reflective surface: 60 degrees;

amount of difference between the rotational center and the deflection starting point (the intersection, when the chief ray of the above-mentioned deflected beam extends in parallel to the optical axes of the lenses 6 and 7, of the chief ray of the beam incident on the deflection reflective surface with the deflection reflective surface): −18.475 mm (in the main scan direction); and −8 mm (in the direction parallel to the optical axes of the lenses 6 and 7);

Effective scanning range: 300 mm;

Cosine value of the maximum value of the angle θ formed between the normal of the surface to be scanned and the scanning beam in the main scan plane within the effective scanning range: cos θ ≧ 0.95.

Shapes of surfaces of the lenses 6 and 7 configuring the scanning optical system are expressed by the following formulas.

However, the present invention is not limited to these formulas.

Expressing a surfaces of a lens, the coordinates in the main scan direction and sub-scan direction on or in the vicinity of the lens surface are determined as Y and Z, respectively, and the X axis (perpendicular to both the Y and Z directions) passing through the origin of these coordinates is determined to be the optical axis of the lens.

The general formula of a lens surface is determined as $$f(Y,Z)=fm(Y)+fs(Y,Z) \quad (8)$$

There, fm(Y) of the first term of the right side expresses the shape in the main scan section (X-Y plane), and fs(Y,Z) of the second term expresses the shape in the sub-scan section at the position of the coordinate Y in the main scan direction.

Then, as the shape fm(Y) in the main scan section (X-Y plane), the depth X in the direction of the optical axis is expressed by a well-known formula for a non-arc shape, that is, the following polynominal, using a radius of paraxial curvature Rm in the main scan section on the optical axis, the distance Y in the main scan direction from the optical axis, a conic coefficient K and high-order coefficients a4, a6, a8, a10, . . . :

$$fm(Y)=(Y^2/Rm)/[1+ \sqrt{\{1-(1+K)(Y/Rm)^2\}}]+a4 \cdot Y^4+a6 \cdot Y^6+a8 \cdot Y^8+a10 \cdot Y^{10}+ \ldots \quad (9)$$

Further, the above-mentioned fs(Y,Z) is expressed as follows:

$$fs(Y,Z)=(Y^2 \cdot Cs)/[1+$$

$$\sqrt{\{1-(1+K)(Y/Cs)^2\}}]+$$

$$(f0+f1 \cdot Y+f2 \cdot Y^2+f3 \cdot Y^3+$$

$$f4 \cdot Y^4+ \ldots ) \cdot Z+$$

$$(g0+g1 \cdot Y+g2 \cdot Y^2+g3 \cdot Y^3+$$

$$g4 \cdot Y^4+ \ldots ) \cdot Z^2+$$

$$(h0+h1 \cdot Y+h2 \cdot Y^2+h3 \cdot Y^3+$$

$$h4 \cdot Y^4+ \ldots ) \cdot Z^3+$$

$$(i0+i1 \cdot Y+i2 \cdot Y^2+i3 \cdot Y^3+$$

$$i4 \cdot Y^4+ \ldots ) \cdot Z^4+$$

$$(j0+j1 \cdot Y+j2 \cdot Y^2+j3 \cdot Y^3+$$

$$j4 \cdot Y^4+ \ldots ) \cdot Z^5+$$

$$(k0+k1 \cdot Y+k2 \cdot Y^2+k3 \cdot Y^3+$$

$$k4 \cdot Y^4+ \ldots ) \cdot Z^6+ \ldots \quad (10)$$

There, $$Cs=(1/Rs0)+b1 \cdot Y+b2 \cdot Y^2+$$

$$b3 \cdot Y^3+b4 \cdot Y^4+b5 \cdot Y^5+$$

$$\ldots \quad (11)$$

$$Ks=c0+c1 \cdot Y+c2 \cdot Y^2+$$

$$c3 \cdot Y^3+c4 \cdot Y^4+c5 \cdot Y^5+$$

$$\ldots \quad (12)$$

The above-mentioned Rs0 is a radius of paraxial curvature in the sub-scan section (plane section parallel to the X-Z plane) including the optical axis. A curved surface expressed by the above formulas (10) through (12) is called 'special toroidal surface'.

The data for the lenses 6 and 7 will now be shown. In the data shown first, the radius of paraxial curvature of the lens surface i-th from the end one on the rotary-polygon-mirror side is referred to as Rmi for the main scan section, and as Rsi for the sub-scan section including the optical axis. Further, the surface separation between the i-th surface of the lens and (i+1)-th surface of the lens is referred to as Di. D0 is the distance from the deflection starting point to the surface of the lens 6 on which the beam is incident on the lens 6. D4 is the distance from the surface of the lens 7 from which the beam exits from the lens 7 to the surface to be scanned. Further, the refractive index (for the wavelength of 400 nm) of the material of the lens j-th from the end one on the rotary-plygon-mirror side is referred to as Nj.

| i | Rmi | Rsi | Di | j | Nj |
|---|---|---|---|---|---|
| 0 | | | 72.7 | | |
| 1 | 2000. | −55.5 | 35.0 | 1 | 1.547 |
| 2 | −151.6 | −174.4 | 65.0 | | |
| 3 | 379.0 | −86.85 | 13.7 | 2 | 1.547 |
| 4 | 800.0 | −30.2 | 157.0 | | |

Then, the coefficients of the above-mentioned formulas (9) through (12) specifying the respective surfaces of lenses will now be mentioned.

For the shape in the main scan section of the first surface (surface of the lens 6 on which the beam is incident on the lens 6):

K=470.6; a4=2.13×10$^{-8}$; a6=9.24×10$^{-13}$; a8=9.29×10$^{-17}$; a10=3.32×10$^{-21}$.

For the shape in the sub-scan section of above-mentioned first surface:

b1=−4.29×10$^{-6}$; b2=−1.94×10$^{-6}$; b3=−3.12×10$^{-9}$; b4=−6.88×10$^{-10}$; b5=9.26×10$^{-13}$; b6=6.14×10$^{-14}$; b7=1.45×10$^{-16}$; b8=2.61×10$^{-17}$; b9=−8.82×10$^{-20}$; b10=1.7×10$^{-21}$; b11=8.41×10$^{-24}$; b12=−7.56×10$^{-25}$.

Thus the shape of the incident surface of the lens 6 is a non-arc shape symmetrical with respect to the optical axis in the main scan section. The shape thereof in the sub-scan section is an arc shape, and the radius of curvature thereof varies asymmetrically in the main scan direction (Y direction) from the reference value of 1/Rs(0) on the optical axis.

For the shape in the main scan section of the second surface (surface of the lens 6 from which the beam exits from the lens 6):

K=−0.117; a4=1.84×10$^{-8}$; a6=1.43×10$^{-12}$; a8=1.92×10$^{-16}$; a10=3.88×10$^{-20}$.

For the shape in the sub-scan section of the above-mentioned second surface:

b2=−4.26×10$^{-6}$; b4=−1.54×10$^{-10}$; b6=1.16×10$^{-14}$; b8=−3.16×10$^{-18}$; b10=−3.61×10$^{-22}$; and b12=2.34×10$^{-25}$.

The shape of this exit surface of the lens 6 is a non-arc shape symmetrical with respect to the optical axis in the main scan section. The shape thereof in the sub-scan section is an arc shape, and the radius of curvature thereof varies symmetrically in the main scan direction (Y direction) from the reference value of 1/Rs(0) on the optical axis.

For the shape in the main scan section of the third surface (surface of the lens 7 on which the beam is incident on the lens 7):

K=−20.0; a4=−5.33×10⁻⁹; a6=−1.00×10⁻¹³; a8=1.80×10⁻¹⁷; a10=1.40×10⁻²¹; a12=4.26×10⁻²⁶; a14=1.83×10⁻³⁰.

For the shape in the sub-scan section of the above-mentioned third surface:

b2=−2.05×10⁻⁷; b4=2.71×10⁻¹¹; b6=−9.93×10⁻¹⁶; b8=1.60×10⁻²⁰; b10=1.07×10⁻²⁴; and b12=−2.18×10⁻²⁸.

The shape of this incident surface of the lens 7 is a non-arc shape symmetrical with respect to the optical axis in the main scan section. The shape thereof in the sub-scan section is an arc shape, and the radius of curvature thereof varies symmetrically in the main scan direction (Y direction) from the reference value of 1/Rs(0) on the optical axis.

For the shape in the main scan section of the fourth surface (surface of the lens 7 from which the beam exits from this lens):

K=−122.1; a4 −1.57×10⁻⁸; a6=2.82×10⁻¹³; a8=2.73×10⁻¹⁷; a10=1.19×10⁻²²; a12=4.67×10⁻²⁶; a14=4.81×10⁻³⁰.

For the shape in the sub-scan section of the above-mentioned fourth surface:

b1=−6.58×10⁻⁷; b2=5.00×10⁻⁷; b3=−1.23×10⁻¹⁰; b4=−3.03×10⁻¹¹; b5=1.83×10⁻¹⁴; b6=1.47×10⁻¹⁵; b7=−7.73×10⁻¹⁹; b8=1.54×10⁻²⁰; b9=−1.445×10⁻²²; b10=−1.57×10⁻²⁴; b11=1.12×10⁻²⁶; b12=−1.61×10⁻²⁸;

c0=−26.66;

i0=−1.16×10⁻⁶; i1=1.27×10⁻⁸; i2=5.34×10⁻⁹; i3=2.07×10⁻¹²; i4=−1.25×10⁻¹³; i5=−3.48×10⁻¹⁵; i6=−1.73×10⁻¹⁷; i7=6.88×10⁻²⁰; i8=−4.06×10⁻²²; i9=9.94×10⁻²³; i10=1.01×10⁻²⁵; i11=−7.46×10⁻²⁷; i12=1.38×10⁻³⁰;

k0=1.36×10⁻⁶; k1=−4.49×10⁻⁹; k2=−1.08×10⁻¹⁰; k3=1.46×10⁻¹²; k4=−2.73×10⁻¹⁴; k5=6.03×10⁻¹⁷; k6=1.56×10⁻¹⁸; k7=−9.83×10⁻²¹; k8=5.66×10⁻²²; k9=−6.89×10⁻²⁴; k10=−2.26×10⁻²⁶; k11=6.13×10⁻²⁸; k12=−1.67×10⁻³⁰.

The shape of this exit surface of the lens 7 is a non-arc shape symmetrical with respect to the optical axis in the main scan section. The shape thereof in the sub-scan direction is a non-arc shape in the sub-scan direction, and is a special toroidal surface such that the above-mentioned non-arc shape varies asymmetrical in the main scan direction (Y direction).

The lens 6 is disposed so that, in the condition in which the chief ray of the deflected beam is parallel to the optical axis of the lens 6, the lens 6 is decentered in a parallel translation manner from this chief ray by 0.09 mm in the main scan direction.

The data of the above-mentioned first embodiment will now be mentioned.

Effective scanning range: 300 m;

Target spot diameter: 30 μm;

Numerical aperture NA=0.0093; and

RMS(wavefront aberration)=0.01.

Figure 4A:
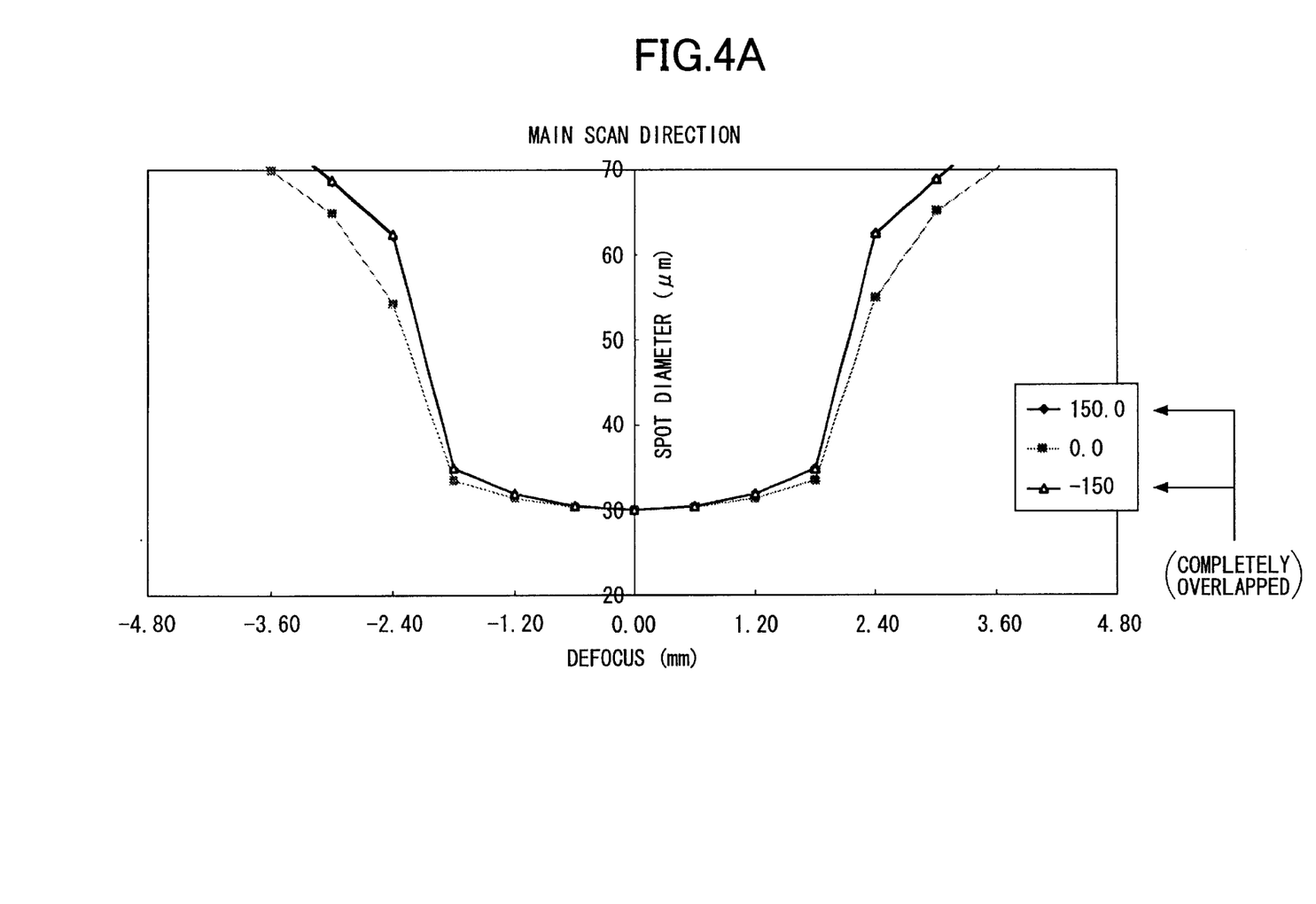
FIGS. 4A and 4B show depth curves for the first embodiment of the present invention.
Figure 4B:
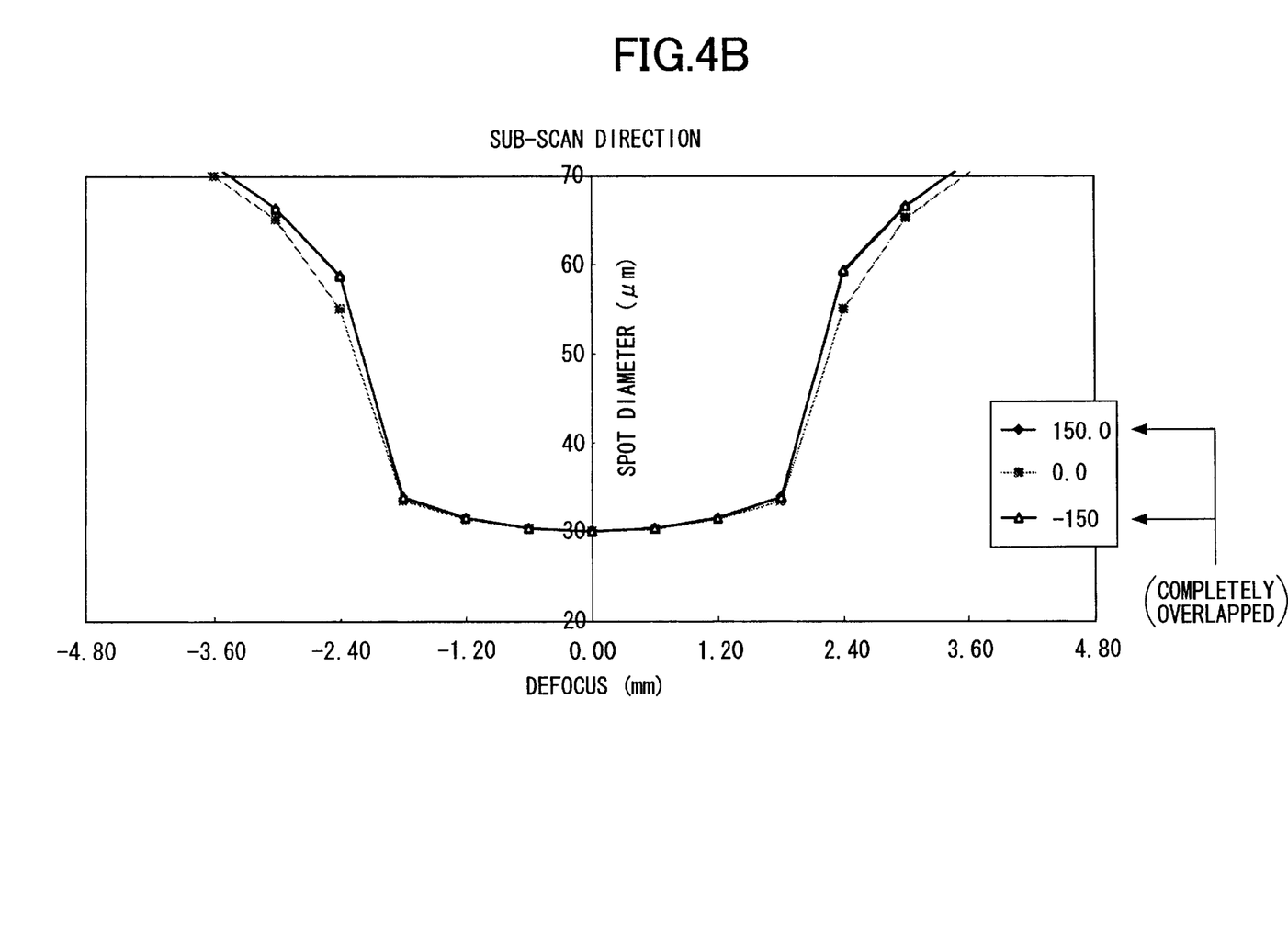

The depth curves (relationship between the defocus and spot diameter) at the image heights of 0 and ±150 mm are shown in FIG. 4A for the main scan direction and FIG. 4B for the sub-scan direction. The target spot diameter φ is 30 μm in each of the main and sub-scan directions. Then, as shown in FIGS. 4A and 4B, the allowable depth on the order of 4 mm which is a very large allowable depth is achieved assuming that the allowable range of the spot diameter is ±10% for each of the main and sub-scan directions.

The target spot diameter φ=30 (μm), and the wavelength λ=400 (nm). Accordingly, $\phi^2/\lambda$=2.25 (mm). Thus, the conditions defined by the above-mentioned formulas (2) and (4) are satisfied.

Further, RMS(wavefront aberration)=0.01, and the condition defiled by the above-mentioned formula (5) is satisfied.

The data of the above-mentioned second embodiment will now be mentioned.

Effective scanning range: 300 m;

Target spot diameter: 15 μm;

Numerical aperture NA=0.0187; and

RMS(wavefront aberration)=0.019.

Figure 5A:
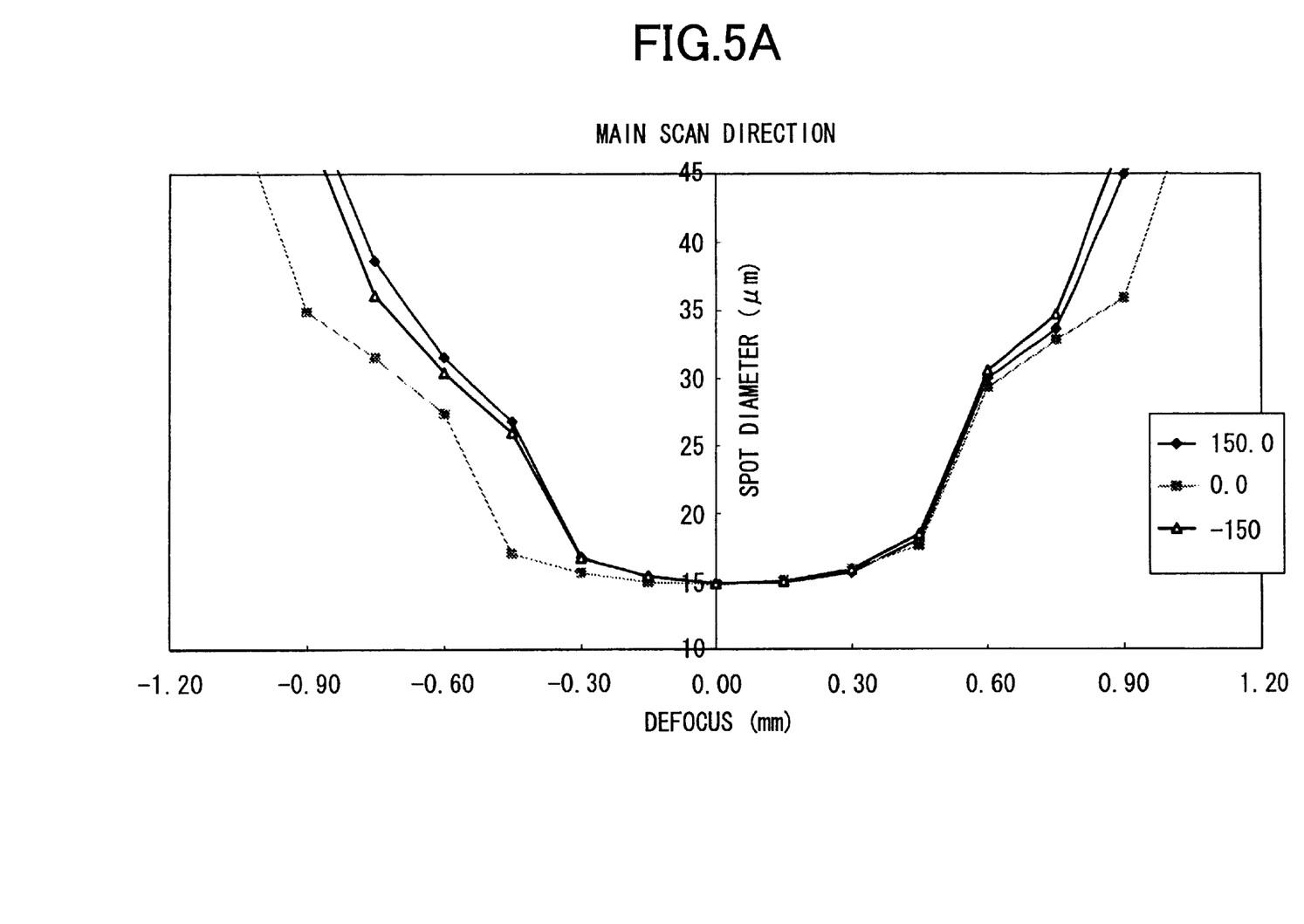
FIGS. 5A and 5B show depth curves for the second embodiment of the present invention.
Figure 5B:
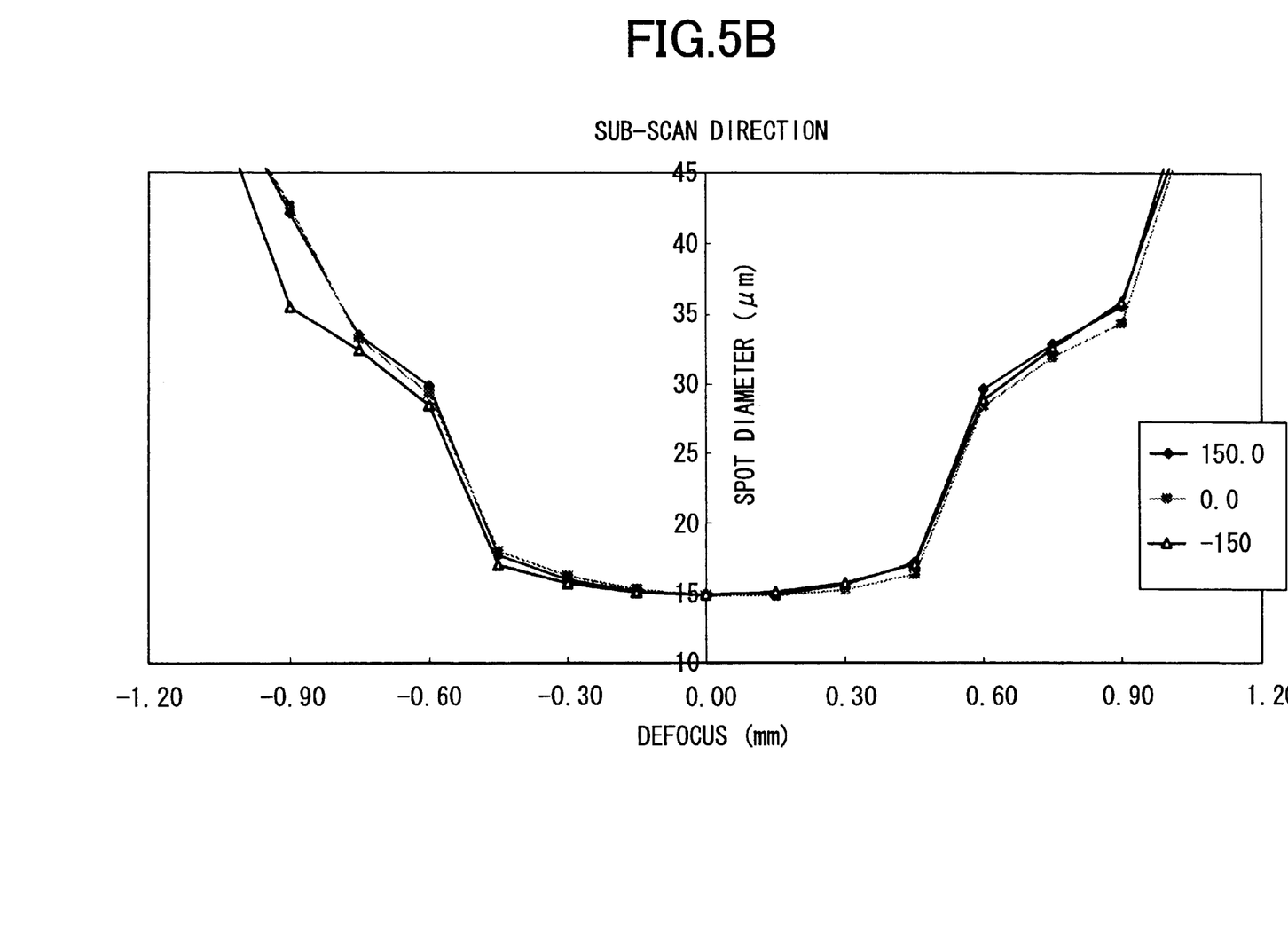

The depth curves (relationship between the defocus and spot diameter) at the image heights of 0 and ±150 mm are shown in FIG. 5A for the main scan direction and FIG. 5B for the sub-scan direction. The target spot diameter φ is 30 μm in each of the main and sub-scan directions. Then, as shown in FIGS. 5A and 5B, the allowable depth larger than 0.7 mm, which is a very large allowable depth with respect to the spot diameter is achieved assuming that the allowable range of the spot diameter is ±20% for each of the main ands sub-scan directions.

The target spot diameter φ=15 (μm), and the wavelength λ=400 (nm). Accordingly, $\phi^2/\lambda$=0.56 (mm). Thus, the conditions defined by the above-mentioned formulas (2) and (4) are satisfied.

Further, RMS(wavefront aberration)=0.02, and the condition defiled by the formula (5) is satisfied.

Then, with reference to FIG. 6, an image forming apparatus in one embodiment of the present invention will now be described.

Figure 6:
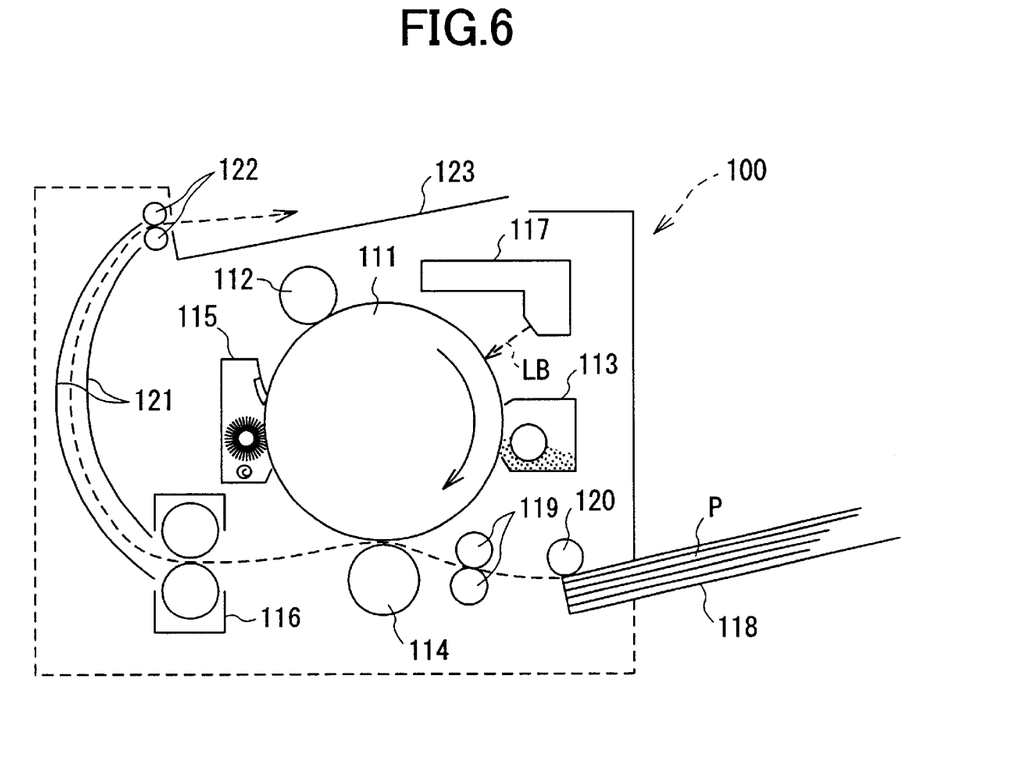
FIG. 6 shows a general side elevational sectional view of an image forming apparatus in one embodiment of the present invention.

The image forming apparatus shown in FIG. 6 is a laser printer.

This laser printer 100 has a cylindrical photoconductive photosensitive body acting as a photosensitive medium 111. In the periphery of the photosensitive medium 111, a charging roller 112 acting as a charging unit, a developing device 113, a transfer roller 114, and a cleaning device 115 are disposed. It is also possible to use a well-known corona charger as the charging unit.

Further, an optical scanning device 117 using a laser beam LB is provided, and performs exposure through optical writing between the charging roller 112 and developing device 113.

As shown in FIG. 6, a fixing device 116, a cassette 118, a pair of registration rollers 119, a paper feeding roller 120, a conveying path 121, a pair of paper ejecting rollers 122, and a tray 123 are also provided. A transfer paper P is used as a sheet recording medium.

When image forming is performed, the photosensitive medium 111 is rotated clockwise at a uniform velocity, the surface thereof is charged uniformly by the charting roller 112, and an electrostatic latent image is formed on the surface of the photosensitive medium 111 through exposure by optical writing with the laser beam LB of the optical scanning device 117. The thus-formed electrostatic latent image is a so-called negative latent image having an image part exposed thereby.

This electrostatic latent image is developed inversely by the developing device 113, and, thus, a toner image is formed on the photosensitive medium 111.

The cassette 118 containing the transfer paper P is detachable from/to the body of the image forming apparatus 100.

In the state in which the cassette 118 is loaded as shown in the figure, the top one sheet of the transfer paper P is fed by the paper feeding roller 120. The thus-fed transfer paper P is nipped by the pair of registration rollers 119 at the top of the paper P. The pair of registration rollers 119 feeds the transfer paper P to a transfer position of the photosensitive medium 111 at the time at which the toner image is moved to the transfer position. The fed transfer paper P is laid onto the toner image at the transfer position, and, by the function of the transfer roller 114, the toner image is transferred to the transfer paper P electrostatically. The transfer paper P thus having had the toner image transferred thereto is sent to the fixing device 116, which fixes the toner image onto the transfer paper P. Then, the transfer paper P passes through the conveying path 121, and is ejected to the tray 123 by the pair of ejecting rollers 122. The surface of the photosensitive medium 111 is then cleaned by the cleaning device 115, and, thus, remaining toner, paper powder and so forth are removed therefrom.

It is also possible to use an OHP sheet instead of the above-mentioned transfer paper. A provision may be made such that the transfer by the toner image is performed via an intermediate transfer medium such as an intermediate transfer belt or the like. By employing the optical scanning device including the scanning imaging optical system such as that shown in FIG. 1 in each of the first and second embodiments of the present invention as the optical scanning device 117, it is possible to render satisfactory image forming.

In the optical scanning device in each of the above-mentioned first and second embodiments of the present invention, the beam from the light source 1 undergoes beam shaping by the aperture 3 having the rectangular opening, is deflected by the light deflector 5, the deflected beam is condensed by the scanning imaging optical system 6 and 7 toward the surface to be scanned 8, thus, a beam spot is formed on the surface to be scanned 8, and, thus, optical scanning is performed on the surface to be scanned 8. There, the wavelength $\lambda$ of the beam emitted by the light source 1 is such that:

$$350 \text{ (nm)} \leq \lambda \leq 600 \text{ (nm)} \tag{1}$$

and, the desired diameter $\phi$ of the beam spot and the above-mentioned $\lambda$ satisfy the following condition:

$$0.5 \text{ (mm)} \leq \phi^2/\lambda \leq 6 \text{ (mm)} \tag{2}$$

Further, the wavelength $\lambda(400 \text{ nm})$ further satisfy the following condition:

$$350 \text{ (nm)} \leq \lambda \leq 500 \text{ (nm)} \tag{3}$$

the desired diameter $\phi$ of the beam spot and the $\lambda$ satisfy the following condition:

$$0.5 \text{ (mm)} \leq \phi^2/\lambda \leq 3 \text{ (mm)} \tag{4}$$

and, also, the root-mean-square value RMS(wavefront aberration) of the wavefront aberrations on the surface of the exit pupil satisfies the following condition:

$$\text{RMS(wavefront aberration)} \leq 0.2 \tag{5}$$

Further, the angle $\theta$ formed on the man scan plane between the normal of the surface to be scanned and any scanning beam satisfies the following condition (cos $\theta$=0.95):

$$\cos \theta \geq 0.9 \tag{6}$$

Further, the light source is the semiconductor laser 1, the divergent beam emitted by the light source 1 is coupled to the subsequent optical system by the coupling optical system 2, the coupled beam undergoes beam shaping by the aperture 3. The coupling optical system is the coupling lens 2, and the coupling function of the coupling lens 2 is the collimating function. Further, the light deflector is the rotary polygon mirror 5 having deflection reflective surfaces, and, the line-image imaging optical system 4 imaging a line image long in the main scan direction on or in the vicinity of the deflection reflective surface is provided.

Further, the scanning optical system which directs the beam emitted from the light source 1 onto the surface to be scanned 8 so as to form the beam spot on the surface to be scanned 8 satisfies the following conditions:

$$350 \text{ (nm)} \leq \lambda \leq 600 \text{ (nm)} \tag{1}$$

$$0.5 \text{ (mm)} \leq \phi^2/\lambda \leq 6 \text{ (mm)} \tag{2}$$

$$\phi = 0.7\lambda/(f/a) \tag{7}$$

There, $\lambda$ denotes the wavelength of the beam emitted by the light source 1; f denotes the distance from the exit pupil of the optical system provided between the aperture 3 and surface to be scanned 8 to the image surface of the scanning imaging optical system 6 and 7; 2a denotes the diameter of the aperture 3 on the surface of the exit pupil; and $\phi$ denotes the desired spot diameter of the beam spot formed on the surface to be scanned 8.

Further, the following conditions are satisfied:

$$350 \text{ (nm)} \leq \lambda \leq 500 \text{ (nm)} \tag{3}$$

$$0.5 \text{ (mm)} \leq \phi^2/\lambda \leq 3 \text{ (mm)} \tag{4}$$

$$\text{RMS(wavefront aberration)} \leq 0.2 \tag{5}$$

Further, the field angle of the scanning imaging optical system is set such that th e angle formed on the main scan plane between the normal of the surface to be scanned and any scanning beam satisfies the following condition:

$$\cos \theta \geq 0.9 \tag{6}$$

Further, the aperture 3 is disposed on the surface-to-be-scanned side of the coupling optical system 2.

Further, the line-image imaging optical system is the convex cylindrical lens 4, and the scanning imaging optical system include lenses 6 and 7 only.

Further, at least one surface of the two lenses 6 and 7 of the scanning imaging optical system is the special toroidal surf ace in which the shape on the main scan section is a non-arc shape, and the shape on the sub scanning section is a non arc shape and varies in the main scan direction.

Thus, according to the present invention, it is possible to provide the novel optical scanning device, scanning optical system, optical scanning method and image forming apparatus.

The optical scanning device according to the present invention can easily and positively achieve the small-sized beam spot by using the light source emitting the beam of the short wavelength, and, also, achieve the satisfactory allowable depth, in comparison to the related art. Accordingly, the optical scanning device and scanning optical system according to the present invention can be easily assembled with low costs. Thus, according to the optical scanning method employing such an optical scanning device, it is possible to achieve high-density optical scanning with a small-sized beam spot.

Further, the image forming apparatus according to the present invention can form images having superior resolution and high quality.

The present invention is not limited to the above-described embodiments, and variations and modifications may be made without departing from the scope of the present invention.

The present application is based on Japanese priority application No. 2000-060120, filed on Mar. 6, 2000, the entire contents of which are hereby incorporated by reference.

What is claimed is:

1. An optical scanning device, comprising:

an aperture shaping a beam from a light source;

a light deflector deflecting the beam; and a scanning imaging optical system condensing the deflected beam toward a surface to be scanned so as to form a beam spot on s aid surface to be scanned, wherein:

a wavelength $\lambda$ of the beam emitted by the light source satisfies:

$$350 \text{ (nm)} \leq \lambda \leq 600 \text{ (nm)} \quad (1)$$

and, a desired diameter $\phi$ of the beam spot and the wavelength $\lambda$ satisfy:

$$0.5 \text{ (mm)} \leq \phi^2/\lambda \leq 6 \text{ (mm)} \quad (2).$$

2. The optical scanning device as claimed in claim 1, wherein:

$$350 \text{ (nm)} \leq \lambda \leq 500 \text{ (nm)} \quad (3)$$

$$0.5 \text{ (mm)} \leq \phi^2/\lambda \leq 3 \text{ (mm)} \quad (4)$$

and, a root-mean-square value RMS(wavefront aberration) of wavefront aberrations on a surface of an exit pupil satisfies:

$$\text{RMS(wavefront aberration)} \leq 0.2 \quad (5).$$

3. The optical scanning device as claimed in claim 1, wherein an angle $\theta$ formed on a main scan plane between a normal of said surface to be scanned and any scanning beam satisfies:

$$\cos \theta \geq 0.9 \quad (6).$$

4. The optical scanning device, as claimed in claim 1, wherein said light source comprises a semiconductor laser.

5. The optical scanning device as claimed in claim 4, wherein:

the divergent beam emitted from the light source is coupled by a coupling optical system to the subsequent optical system, and the thus-coupled beam is shaped by the aperture.

6. The optical scanning device as claimed in claim 5, wherein said coupling optical system comprises a coupling lens, and the coupling function thereof comprises a collimating function.

7. The optical scanning device as claimed in claim 5, wherein:

said light deflector comprises a rotary mirror comprising a deflection reflective surface; and said device further comprises a line-image imaging optical system imaging a line image long in a main scan direction on or in the vicinity of said deflection reflective surface, from the coupled beam.

8. An optical scanning method of shaping a beam from a light source by an aperture, deflecting the beam by a light deflector, condensing the deflected beam toward a surface to be scanned by a scanning imaging optical system and forming a beam spot on the surface to be scanned, and, thus, performing optical scanning of the surface to be scanned, wherein the optical scanning device claimed in claim 1 is used in the method.

9. An image forming apparatus performing optical scanning of a photosensitive surface of a photosensitive medium by an optical scanning device, and forming a latent image thereon, visualizing the latent image so as to obtain a visible image, wherein the optical scanning device claimed in claim 1 is used for performing the optical scanning of the photosensitive surface of the photosensitive medium.

10. The image forming apparatus, as claimed in claim 9, wherein said photosensitive medium comprises a photoconductive photosensitive body, and, the electrostatic latent image formed through uniform charging of said photosensitive surface and optical scanning thereof by the optical scanning device is visualized into a toner image.

11. A scanning optical system used in an optical scanning device comprising an aperture shaping a beam from a light source, a light deflector deflecting the beam, and a scanning imaging optical system condensing the deflected beam toward a surface to be scanned so as to form a beam spot on said surface to be scanned, and, thus, performing optical scanning of said surface to be scanned, wherein:

said scanning optical system directs the beam from said light source which emits light having a predetermined wavelength $\lambda$ which satisfies:

$$350 \text{ (nm)} \leq \lambda \leq 600 \text{ (nm)} \quad (1)$$

to said surface to be scanned so as to form the beam spot thereon;

said scanning optical system comprises at least said aperture, light deflector and scanning imaging optical system; and said scanning optical system satisfies the following conditions for a desired diameter $\phi$ of the beam spot:

$$0.5 \text{ (mm)} \leq \phi^2/\lambda \leq 6 \text{ (mm)} \quad (2)$$

$$\phi = 0.7\lambda/(f/a) \quad (7)$$

where f denotes a distance from an exit pupil of the optical system disposed on the said-surface-to-be-scanned side of said aperture to an image surface of said scanning imaging optical system, and 2a denotes a diameter of said aperture on a surface of the exit pupil.

12. The scanning optical system as claimed in claim 11, wherein;

the predetermined wavelength $\lambda$ falls within a range such that:

$$350 \text{ (nm)} \leq \lambda \leq 500 \text{ (nm)} \quad (3)$$

the desired spot diameter $\phi$ of the beam spot and predetermined wavelength $\lambda$ satisfy the following conditions:

$$0.5 \text{ (mm)} \leq \phi^2/\lambda \leq 3 \text{ (mm)} \quad (4)$$

and, also, a root-mean-square value RMS(wavefront aberration) of wavefront aberrations on a surface of an exit pupil satisfies the following condition:

$$\text{RMS(wavefront aberration)} \leq 0.2 \quad (5).$$

13. The scanning optical system as claimed in claim 11, wherein a field angle of the scanning imaging optical system is set such that an angle θ formed on a main scan plane between a normal of said surface to be scanned and any scanning beam satisfies the following condition:

$$\cos \theta \geq 0.9 \quad (6).$$

14. The scanning optical system as claimed in claim 11, wherein:

said light source comprises a semiconductor laser;

the divergent beam emitted from the light source is coupled by a coupling optical system to the subsequent optical system; and said aperture is disposed on said surface-to-be-scanned side of said coupling optical system.

15. The scanning optical system as claimed in claim 14 wherein said coupling optical system comprises a coupling lens, and the coupling function thereof comprises a collimating function.

16. The scanning optical system as claimed in claim 14, wherein:

said light deflector comprises a rotary mirror comprising a deflection reflective surface; and said system further comprises a line-image imaging optical system imaging a line image long in a main scan direction on or in the vicinity of said deflection reflective surface, from the coupled beam.

17. The scanning optical system as claimed in claim 16, wherein said line-image imaging optical system comprises a convex cylindrical lens.

18. The scanning optical system as claimed in claim 14, wherein said scanning imaging optical system comprises a lens only.

19. The scanning optical system as claimed in claim 18, wherein said scanning imaging optical system comprises two lenses.

20. The scanning optical system as claimed in claim 19, wherein:

said coupling optical system comprises a coupling lens, and the coupling function thereof comprises a collimating function; and at least one surface of said two lenses of said scanning imaging optical system comprises a special toroidal surface in which a shape in a main scan section is a non-arc shape, and a shape in a sub-scan section is a non-arc shape and varies in a main scan direction.

21. An optical scanning device, comprising:

aperture means for shaping a beam from a light source;

light deflector means for deflecting the beam; and a scanning imaging means for condensing the deflected beam toward a surface to be scanned so as to form a beam spot on said surface to be scanned, wherein:

a wavelength λ of the beam emitted by the light source satisfies:

$$350 \text{ (nm)} \leq \lambda \leq 600 \text{ (nm)} \quad (1)$$

and, a desired diameter ϕ of the beam spot and the wavelength λ satisfy:

$$0.5 \text{ (mm)} \leq \phi^2/\lambda \leq 6 \text{ (mm)} \quad (2).$$

22. A scanning optical system used in an optical scanning device comprising aperture means for shaping a beam from a light source, a light deflector means for deflecting the beam, and a scanning imaging means for condensing the deflected beam toward a surface to be scanned so as to form a beam spot on said surface to be scanned, and, thus, performing optical scanning of the surface to be scanned, wherein:

said scanning optical system directs the beam from said light source which emits light having a predetermined wavelength which satisfies:

$$350 \text{ (nm)} \leq \lambda \leq 600 \text{ (nm)} \quad (1)$$

to said surface to be scanned so as to form the beam spot thereon;

said scanning optical system comprises at least said aperture means, light deflector means and scanning imaging means; and said scanning optical system satisfies the following conditions for a desired diameter ϕ of the beam spot:

$$0.5 \text{ (mm)} \leq \phi^2/\lambda \leq 6 \text{ (mm)} \quad (2)$$

$$\phi = 0.7\lambda/(f/a) \quad (7)$$

where f denotes a distance from an exit pupil of the optical system disposed on the said-surface-to-be-scanned side of said aperture to an image surface of said scanning imaging means, and 2a denotes a diameter of said aperture means on a surface of the exit pupil.

* * * * *